Patented Dec. 14, 1943

UNITED STATES PATENT OFFICE 2,336,688

REMOVING SULPHUR HALIDE IMPURITIES FROM SULPHUR

James I. Jones, Midland, Mich., and Leo D. Richards, Freeport, Tex., assignors to The Dow Chemical Company, Midland, Mich., a corporation of Michigan No Drawing. Application April 22, 1941, Serial No. 389,792

5 Claims. (Cl. 23—224)

This invention concerns a method of purifying sulphur which contains sulphur halide impurities.

Impure sulphur, containing sulphur halides, is recovered in large quantities from various chemical processes such as those for the production of acyl halides, halo-organic acids, and other organic halides wherein sulphur is used as a catalyst for the halogenation, or sulphur halides are used as halogenating agents, or the organic halide is formed by halogenating an organic sulphide or other organic sulphur compound to displace the sulphur with halogen, etc. In the commercial processes with which we are familiar, the proportion of sulphur halides in the recovered sulphur is usually less than 10 per cent by weight, e. g. from 1 to 5 per cent, but it may sometimes be higher. Due to the presence of the sulphur halides, the recovered sulphur is unsatisfactory for many of the purposes to which pure sulphur is adapted.

The sulphur halides in the recovered sulphur may not satisfactorily or economically be removed by distillation or other usual purification procedures and the methods heretofore proposed for their removal are inconvenient and add appreciably to the cost of the product. For instance, in Russian Patent 39,081 it is reported that sulphur may be freed of sulphur halides by heating it with an aqueous alkali solution, first at temperatures of 140° to 145° C., then at 170°-175° C. These operations, which involve the consumption of alkali and must necessarily be carried out in an autoclave, are inconvenient and expensive.

In our earlier attempts to purify recovered sulphur which contained sulphur chlorides (largely $S_2Cl_2$), we melted the material and treated it with hot water. This resulted in foaming and the formation of an acidic mass which was highly corrosive to iron and steel apparatus. The sulphur was not satisfactorily purified, possibly due in part to the fact that the mixture foamed too badly to permit prolonged heating.

However, we have since discovered that sulphur halides, particularly sulphur chlorides, may readily be removed from sulphur by melting the latter and blowing the molten mass with steam. Under these conditions the steam and sulphur halides react rapidly to form elemental sulphur and evolve hydrogen halide and some sulphur dioxide. The reaction appears to occur largely as illustrated by the equation:

$$2S_2Cl_2 + 2H_2O \rightarrow SO_2 + 4HCl + 3S$$

but other reactions may also take place. The steam sweeping through the mass carries off the hydrogen halide and sulphur dioxide and thereby promotes rapid and substantially complete reaction.

We have further found that when superheated, or dry, steam is used in the process, the molten mass does not become excessively corrosive to iron or steel, and the treatment may satisfactorily be carried out in an ordinary steel container. The evolved vapors are, of course, corrosive and they are vented through corrosion-resistant lines. The hydrogen halide and sulphur dioxide in the vapors may be collected as by-products from the treatment.

The treatment with steam is usually carried out at atmospheric pressure or somewhat above, e. g. at from 1 to 2 atmospheres pressure. However, it may be carried out at sub-atmospheric pressure sometimes with advantage. It is continued until the evolved vapors are substantially free of hydrogen halide. By operating in such manner, not only the free sulphur, but also a large proportion of the sulphur initially present as sulphur halide, may be recovered in purified elemental form.

The following example illustrates one way in which the principle of the invention has been applied, but is not to be construed as limiting the invention.

Example

A 16 ton batch of sulphur which had been recovered from a chlorination process and which contained approximately 1.1 per cent of chlorine chemically combined as sulphur chlorides (largely $S_2Cl_2$) was melted. Dry steam, superheated to 135° C., was blown through the molten mass for about 4 hours, i. e. until the evolution of hydrogen chloride with the steam had substantially ceased. The residual sulphur contained only 0.03 per cent of chlorine.

The method as herein described may be employed to remove other sulphur halides, e. g. sulphur bromide, etc., from sulphur containing the same.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of removing halogen from a molten mixture comprising sulphur and a sulphur halide, which mixture is contained in a vessel of a ferrous metal that is susceptible to corrosion by hydrochloric acid, the step of blowing steam through the molten mixture, whereby the sulphur halide is largely decomposed by reaction with the steam and the resultant acidic vapors are swept from the sulphur by the steam without appreciable corrosion of the metal vessel.

2. The method which comprises melting sulphur which contains a minor proportion of a sulphur halide and passing superheated steam through the molten mixture which is contained in a vessel of a ferrous metal that is susceptible to corrosion by hydrochloric acid, whereby steam is reacted with the sulphur halide to decompose the latter with formation of elemental sulphur and acidic gases and the acidic gases are blown from the sulphur by the steam without appreciable corrosion of the metal vessel.

3. In a method of removing a sulphur chloride from sulphur containing the same, the step of blowing steam through the impure sulphur while in molten condition and in a vessel of a ferrous metal which is susceptible to corrosion by hydrochloric acid, whereby the sulphur chloride is largely decomposed by reaction with the steam and the resultant acidic vapors are swept from the sulphur without appreciable corrosion of the metal vessel.

4. In a method of removing a sulphur chloride from sulphur containing the same, the step of blowing substantially dry steam through the impure sulphur while in molten condition and in a vessel of a ferrous metal that is susceptible to corrosion by hydrochloric acid, whereby the sulphur chloride is largely decomposed by reaction with the steam and the resultant acidic vapors are swept from the sulphur without appreciable corrosion of the metal vessel.

5. In a method of removing sulphur monochloride from sulphur containing the same, the step of blowing superheated steam through the impure sulphur, while in molten condition and in a vessel of a ferrous metal that is susceptible to corrosion by hydrochloric acid until the steam being evolved is substantially free of hydrogen chloride, whereby the sulphur monochloride is largely destroyed without extensive corrosion by the resultant acidic compounds of the metal vessel containing the molten sulphur.

JAMES I. JONES.
LEO D. RICHARDS.